July 1, 1958      J. P. LONGWELL      2,840,988
FUEL CONTROL APPARATUS FOR SUPERSONIC RAMJET
Filed July 17, 1952
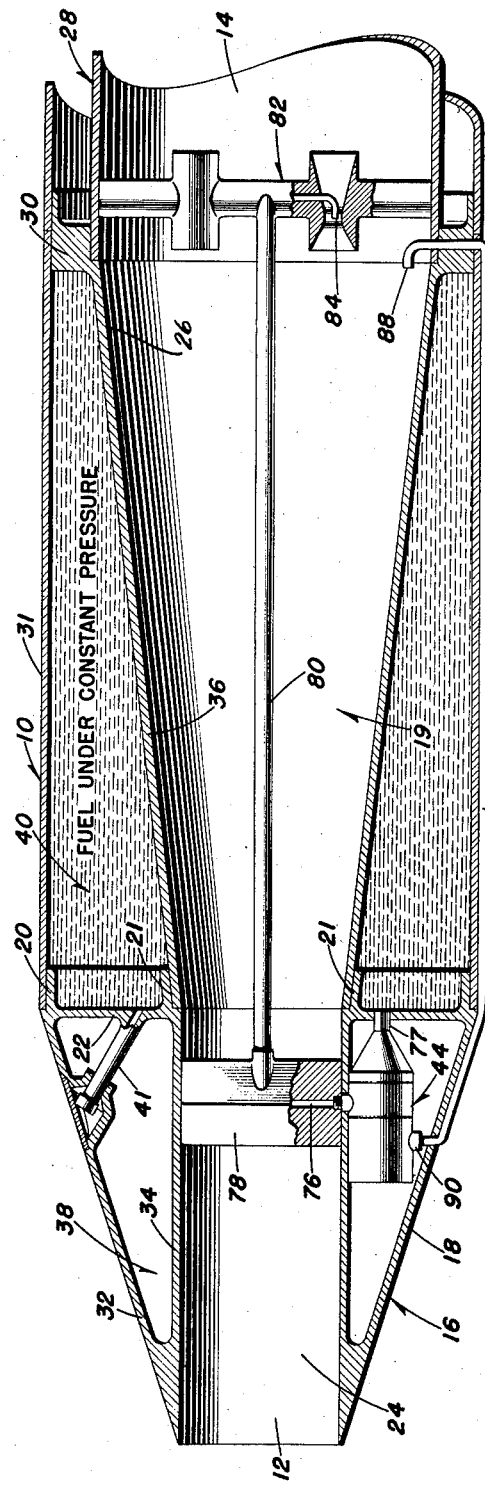
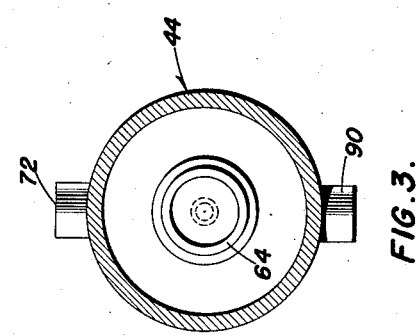
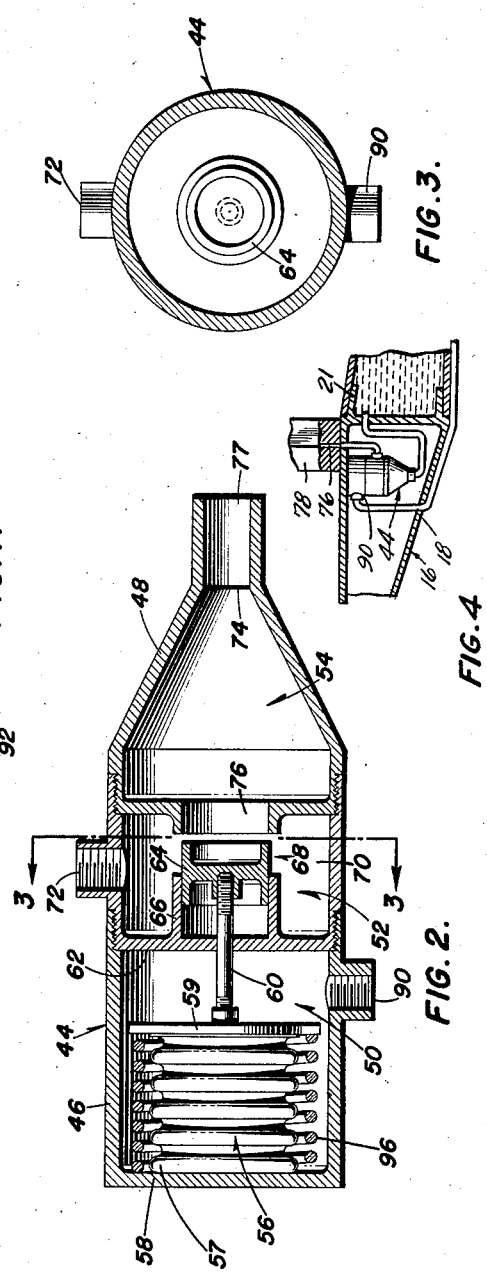
INVENTOR.
JOHN P. LONGWELL
BY
ATTORNEYS

United States Patent Office 2,840,988
Patented July 1, 1958

2,840,988

FUEL CONTROL APPARATUS FOR SUPERSONIC RAMJET

John P. Longwell, Westfield, N. J., assignor, by mesne assignments, to the United States of America as represented by the Secretary of the Navy Application July 17, 1952, Serial No. 299,441

6 Claims. (Cl. 60—39.28)

This invention pertains generally to aerial missiles. More particularly, it relates to a device for controlling the rate of flow of fuel to the combustion chamber of a supersonic ram-jet engine.

A ram-jet engine depends on ram pressure for its operation. The operation of the engine is obtained by accelerating the aerial missile, containing the ram-jet engine, to supersonic speed, and then igniting the liquid fuel mixture. Since there is the possibility that combustion of the fuel mixture may be lost during the flight of the aerial missile, it is also necessary to ignite the fuel mixture during the flight period. Therefore, adequate and precise control of the air-fuel ratio is required prior to as well as during combustion of the fuel mixture.

It is, therefore, one of the principal objects of this invention to provide a fuel control metering arrangement for precisely controlling the rate of flow of fuel to a combustor of a supersonic ram-jet engine during non-burning as well as during burning conditions.

Another object of this invention is to provide a device that utilizes the static and impact pressures in the diffuser exit for controlling the rate of fuel flow in a ram-jet engine.

Still another object of the invention is to provide a device that will deliver a flow of fuel proportional to the pressure at the diffuser outlet and which will maintain constant air-fuel ratio under various operating conditions, or which will deliver a varying air-fuel ratio as the air rate varies.

And another object of the invention is to provide a fuel control device for a ram-jet engine that is compact and economical to manufacture, reliable and efficient in operation under varying operating conditions, and easy to install.

These and other objects and advantages of the invention will be apparent from the following description, and accompanying drawings in which:

Fig. 1 is a fragmentary view partially in elevation, of a portion of a ram-jet engine embodying the invention;

Fig. 2 is an enlarged view of the fuel metering device shown in Fig. 1;

Fig. 3 is a cross-section on the line 3—3 of Fig. 2; and

Fig. 4 is a fragmentary section showing the valve arranged perpendicular to the axis of the missile.

This invention is chiefly concerned with a control device for metering the proper amount of fuel to a supersonic ram-jet combustor. This is accomplished by means of a valve arrangement through which the rate of flow of fuel is proportional to the pressure in the diffuser exit. In an actual embodiment of the invention, pressure is applied to an evacuated Sylphon type metal bellows which, in turn, actuates a valve located in a fuel line. This valve is contoured to deliver the desired fuel rate from a fuel chamber, where the fuel is under a constant source of fuel pressure, to injection nozzles which inject the fuel into the air stream passing through the diffuser into the combustor. The device can be mounted in the diffuser or in another part of the ram-jet engine.

It is deemed desirable, prior to actually describing an embodiment of the invention, to review briefly the theory of operation of the metering device or arrangement forming the subject matter of the present invention.

A study of the flow of air through the duct of a ram-jet engine has revealed that for constant combustion efficiency with a Mach number of one (1) in the tailpipe throat, both static and stagnation (static plus impact) diffuser outlet pressures are nearly linear with air rate. This relationship is quite insensitive to the temperature of the air. A metering or control device constructed to deliver an amount of fuel directly proportional to either the stagnation pressure, the static pressure, or a combination of these pressures will hold a constant air-fuel ratio.

Turning now to the drawings and a more detailed description of a typical embodiment of the invention, there is illustrated in Fig. 1 the tubular body of a ram-jet engine designated generally by reference numeral 10. This jet engine is generally a part of an aerial missile, but is not necessarily limited thereto.

This body 10 is formed of heavy gauge sheet metal, and is open at both ends 12 and 14 thereof.

The forward end of the body is partially enclosed by a nose assembly section 16, which includes a nose or ogive 18 of metal or plastic material. Section 16 can be made either integral with body 10, or as a separate section, as illustrated in Fig. 1. In this case, section 16 is connected to body 10 and a frusto-conical diffuser section 19 by flange portions 20 and 21 of annular flange 22.

Ogive section 16 is formed with a central passage 24 which is in open communication with frusto-conical diffuser section 19. The rear end 26 of diffuser section 19 is maintained in engagement with a tailpipe section 28 through annular flange member 30. This tailpipe section contains a combustor chamber and an exit nozzle.

Flange member 22, it will be observed, divides the annular cavity between walls 31, 32, 34 and 36 into two sections 38 and 40. The first section 38 can be utilized, as will be described presently, for housing the fuel metering device of the present invention, while section 40 contains the constant pressure liquid fuel source for the ram-jet engine. Section 40 can be filled with fuel, such as kerosene or the like, through entrance passageway 41.

The fuel metering arrangement or device 44, with which this invention is particularly concerned, is shown generally in Fig. 1, and in detail in Fig. 2. It includes a cylindrical housing 46, which is frusto-conical in shape at its forward portion 48.

The device is divided into three sections 50, 52 and 54. In section 50, there is located an evacuated Sylphon type metal bellows 56, which has one end 57 attached to wall 58 of housing 46, while the other end 59 is connected to a valve rod 60. A spring member 96 prevents the metal bellows 56 from collapsing.

This valve rod 60 passes through a partition wall 62, which separates sections 50 and 52, to a valve mechanism 64, contained in section 52. This valve mechanism 64 operates in a cylindrical housing 66 and controls the size of the opening 68 formed in cylindrical housing 66. This valve mechanism is designed to give the required rate of fuel flow from chamber section 54 to chamber section 52. An annular cavity 70 surrounds cylindrical housing 66. Section 52 contains an exit 72.

Section 54, which is generally frusto-conical in shape, has an entrance 74 and an exit 76 into section 52.

It is to be observed that the fuel metering arrangement 44 just described can be mounted other than as shown. For example, the metering arrangement can be mounted in the diffuser or in another part of the ram-jet engine.

In addition, the valve axis can be located parallel to the axis of the combustor, as shown in Fig. 2, or perpendicular thereto. If the valve axis is located parallel to the axis of the combustor, launching acceleration will either tend to open or close the valve depending on which direction it opens. This arrangement can be utilized to make the fuel mixture leaner at starting or it could be made richer if it should prove to be advantageous to do so. If no change in the mixture is desired, the valve axis is mounted perpendicular to the axis of the combustor.

Having described an actual embodiment of the invention, the operation thereof will now be set forth. Unmetered fuel, under constant pressure, flows from fuel chamber 40 through a piping connection 77 and entrance 74 into section 54. The fuel then passes through exit 76, into section 52. As the fuel passes from section 54 to section 52, it is metered by valve mechanism 64. The fuel then passes through opening 68 into annular cavity 70, thence through the exit 72, pipe line 76 in strut member 78, and pipe line 80, and thence to a nozzle arrangement, shown generally by 82, where it is injected into the air stream by injection nozzles 84.

Impact and static pressure at the diffuser exit 26, are introduced into chamber section 50 through an entrance 88 and an exit 90 in a piping arrangement 92. These pressures are exerted against the evacuated Sylphon bellows 56, which, in turn, actuate valve rod 60 and valve mechanism 64 which controls the amount of liquid fuel passing through the opening 68.

In summary, an aerial missile, which includes the ram-jet engine having the fuel metering arrangement described herein, and a detachable launching carriage, is launched by a launching carriage from a platform or the like (all of which are not shown). At a certain point along the trajectory, the launching carriage will have spent its power, and will therefore separate from the aerial missile. The ram-jet engine will then furnish the source of power for the aerial missile.

Unmetered fuel from fuel chamber 40 passes into unmetered fuel section 54, to section 52 where it is metered by valve mechanism 64. The metered fuel from section 52 passes through pipe lines 76 and 80 to the fuel injection nozzles 84, where it is injected into the air stream in the proper quantity, i. e., in such an amount to give the required air-fuel ratio.

The fuel mixture is then swept further downstream into the combustion chamber in the tailpipe section 28 of the ram-jet engine where it is ignited by a remote controlled igniter or by other means. The gases generated by the burning of the fuel mixture are then expelled through an exit nozzle in the tailpipe section 28 at a greater velocity than that of air entering the engine, and are thus utilized to power the aerial missile along its trajectory.

In a general manner, while there has been disclosed what is deemed to be a practical and efficient embodiment of the invention, it should be well understood that the invention is not limited thereto, as changes can be made in the arrangement, disposition, and form of the parts without departing from the principle and spirit of the invention, as comprehended within the scope of the appended claims.

What is claimed is:

1. In combination, an aerial missile having a body in the form of an elongated tubular duct, a diffuser and a combustor in said duct, means for deriving the static and impact pressures in said duct at the diffuser exit, a device controlled by said static and impact pressures, a fuel line, and a flow control valve actuated by said device, said valve being interposed in said fuel feed line.

2. An arrangement as claimed in claim 1, wherein said device includes at least one bellows.

3. An arrangement as claimed in claim 1, wherein the axis of the valve is parallel to the axis of the combustor.

4. An arrangement as claimed in claim 1, wherein the axis of the valve is perpendicular to the axis of the combustor.

5. In combination, an aerial missile having a body in the form of an elongated tubular duct, a diffuser in said duct, a fuel chamber in the body of said duct, a metering arrangement connected to said fuel chamber for metering said fuel, said metering arrangement being responsive only to static and impact pressures in said duct at the diffuser exit, and means connected to said metering arrangement for receiving and injecting the metered fuel into the air stream passing through said duct, whereby a constant air-fuel ratio is maintained.

6. In combination, an aerial missile having a body in the form of an elongated tubular duct, a diffuser in said duct, a fuel chamber in the body of said duct, and means including a bellows for controlling the rate of fuel flow from said fuel chamber to said duct, said means being responsive only to static and impact pressures from the exit of said diffuser.

References Cited in the file of this patent

UNITED STATES PATENTS

| 2,540,594 | Price | Feb. 6, 1951 |
| 2,550,678 | Deacon | May 1, 1951 |
| 2,563,024 | Goddard | Aug. 7, 1951 |
| 2,566,319 | Deacon | Sept. 4, 1951 |

FOREIGN PATENTS

| 439,805 | Great Britain | Dec. 6, 1935 |